(12) United States Patent
Dikmen

(10) Patent No.: US 7,133,500 B2
(45) Date of Patent: Nov. 7, 2006

(54) METHOD AND APPARATUS FOR INTERCEPT OF WIRELINE COMMUNICATIONS

(75) Inventor: Cemal Tamer Dikmen, Shelton, CT (US)

(73) Assignee: SS8 Networks, Inc., San Jose, CA (US)

(\*) Notice: Subject to any disclaimer, the term of this patent is extended or adjusted under 35 U.S.C. 154(b) by 0 days.

(21) Appl. No.: 10/295,598

(22) Filed: Nov. 15, 2002

(65) Prior Publication Data
US 2003/0108182 A1 Jun. 12, 2003

Related U.S. Application Data

(63) Continuation of application No. 09/186,970, filed on Nov. 5, 1998, now Pat. No. 6,549,613.

(51) Int. Cl.
*H04M 1/64* (2006.01)
(52) U.S. Cl. ............... 379/70; 379/134; 379/213.01
(58) Field of Classification Search ........ 379/32.01, 379/32.02, 32.03, 32.05, 35, 221.01, 221.09, 379/221.13, 88.26, 230
See application file for complete search history.

(56) References Cited

U.S. PATENT DOCUMENTS

| | | | | |
|---|---|---|---|---|
| 5,471,519 A | * | 11/1995 | Howe et al. | 379/88.26 |
| 5,590,171 A | | 12/1996 | Howe et al. | 379/33 |
| 5,881,132 A | | 3/1999 | O'Brien et al. | 379/35 |
| 5,923,744 A | * | 7/1999 | Cheng | 379/221.09 |
| 5,930,698 A | * | 7/1999 | Bertacchi | 379/35 |
| 5,937,035 A | | 8/1999 | Andruska et al. | 379/34 |
| 6,078,648 A | * | 6/2000 | Albers et al. | 379/221.13 |
| 6,160,883 A | * | 12/2000 | Jackson et al. | 379/230 |
| 6,233,313 B1 | * | 5/2001 | Farris et al. | 379/35 |
| 6,496,483 B1 | * | 12/2002 | Kung et al. | 379/35 |

FOREIGN PATENT DOCUMENTS

| WO | WO 97/41678 | 4/1996 |
|---|---|---|
| WO | WO 98/48574 | 4/1997 |

OTHER PUBLICATIONS

*Intermin Standard (Trial Use Standard)—Lawfully Authorized Electronic Surveillance—J-STD-025*, Telecommunications Industry Association, Arlington, VA (Dec. 1997).
*Joint TIA Interim Standard/T1 Trial (Use Standard—J-STD-25 (SP-3580A+) Requirements Matrix (Draft)*, C.I.S., 39 p. (Dec. 5, 1997).
*Outline of Missing Capabilities Nos. 1-11*, C.I.S., 35 p. (Aug. 27, 1997).

\* cited by examiner

*Primary Examiner*—Gerald Gauthier
(74) *Attorney, Agent, or Firm*—Morgan, Lewis & Bockius LLP

(57) ABSTRACT

Method and apparatus for conducting surveillance in a SS7 Intelligent Network (IN) or Advanced Intelligent Network (AIN) provides in the case of AIN that an Info Analyzed trigger is armed in an end office switch and notifies a delivery function when a call is processed. The delivery function instructs the end office switch to forward the call to the delivery function, where it is accessed for monitoring forwarded back to the end office switch. A similar method is used to process calls received by the SUS. In the case of IN, the identity of a line card assigned to a subscriber under surveillance (SUS) is changed to a number dedicated to surveillance subjects. Calls originated by the SUS are forwarded to a delivery function, which identifies the SUS based on the dedicated number of the calling party, intercepts call content, and forwards the call back to the end office switch with the called party id aid the original number and id of the SUS. The end office switch then completes the call. A similar method is used to process calls received by the SUS.

8 Claims, 11 Drawing Sheets

METHOD AND APPARATUS FOR INTERCEPT OF WIRELINE COMMUNICATIONS

This application is a continuation of U.S. non-provisional patent application No. 09/186,970, filed Nov. 5, 1998 now U.S. Pat No. 6,549,613, Method and Apparatus for Interception of Wireline Communications.

TECHNICAL FIELD OF THE INVENTION

The present invention relates generally to telecommunications, and more particularly to the lawful intercept of telephony communications in a telecommunications network using Signaling System 7 (SS7).

BACKGROUND OF THE INVENTION

Court authorized access to telephone communications and call-identifying information is one of the most crucial tools for effective law enforcement. The introduction of new digitally based technologies, transmission modes, services, and features have made it increasingly difficult for law enforcement to conduct court authorized electronic surveillance. In October of 1994, at the request of the nation's law enforcement community, Congress took action to protect public safety and national security by enacting the Communications Assistance for Law Enforcement Act (CALEA). CALEA sets forth the interception assistance capability requirements that telecommunications carriers need to meet and maintain within their networks to assist law enforcement in conducting electronic surveillance. These requirements apply to the intercept of wireline and wireless communications.

In order to meet the requirements of law enforcement to intercept communications, the telecommunications industry has defined an interface specification between a Telecommunication Service Provider (TSP) and a Law Enforcement Agency (LEA), called the J-STD-025 (Lawfully Authorized Electronic Surveillance). The J-STD-025, "Lawfully Authorized Electronic Surveillance", is a joint standard by the Telecommunications Industry Association (TIA) Committee TR45.2 and the Alliance for Telecommunications Industry Solutions (ATIS) Committee T1-Telecommunications. Compliance to J-STD-025 is seen by the telecommunications industry as "safe harbor" under Section 107 of the CALEA, Public Law 103-414.

J-STD-025 views the intercept function as five broad categories: access, delivery, collection, service provider administration, and law enforcement administration. The relationships between these functional categories are shown in FIG. 1. As illustrated in FIG. 1, the Service Provider Administrative Function 10 is responsible for controlling the TSP access and delivery functions. The Law Enforcement Administrative Function 11 is responsible for controlling the LEA collection functions. The access function 14, consisting of one or more Intercept Access Points (IAPs), isolates an intercept subject's communications or call-identifying information unobtrusively. The access function 14 provides access to communications traversing a telecommunications network. The deliver function 16 is responsible for accepting information from one or more access functions 14 and delivering intercepted communications to one or more collection functions 18. The delivery function 16 delivers information over two distinct types of channels: Call Content Channels (CCCs) and Call Data Channels (CDCs). The CCCs are generally used to transport call content, such as voice or data communications. The CDCs are generally used to transport messages which report call-identifying information, such as calling party identities and called party identities. The collection function 18 is responsible for collecting and analyzing intercepted communications and call-identifying information. The collection function 18 is the responsibility of the LEA.

SUMMARY OF THE INVENTION

The present invention provides method and apparatus for intercepting calls for a subject under surveillance (SUS) in a Signaling System 7 (SS7) compliant telephone system, or a telephone system with equivalent relevant functions, by forwarding calls for a SUS from the end office switch to a delivery function, which in turn forwards the calls back to the end office switch for further processing, and in addition obtains call content and information as the call passes through the delivery function. The delivery function can in turn deliver call content and information to a collection function.

DETAILED DESCRIPTION OF THE INVENTION

Figure 1:
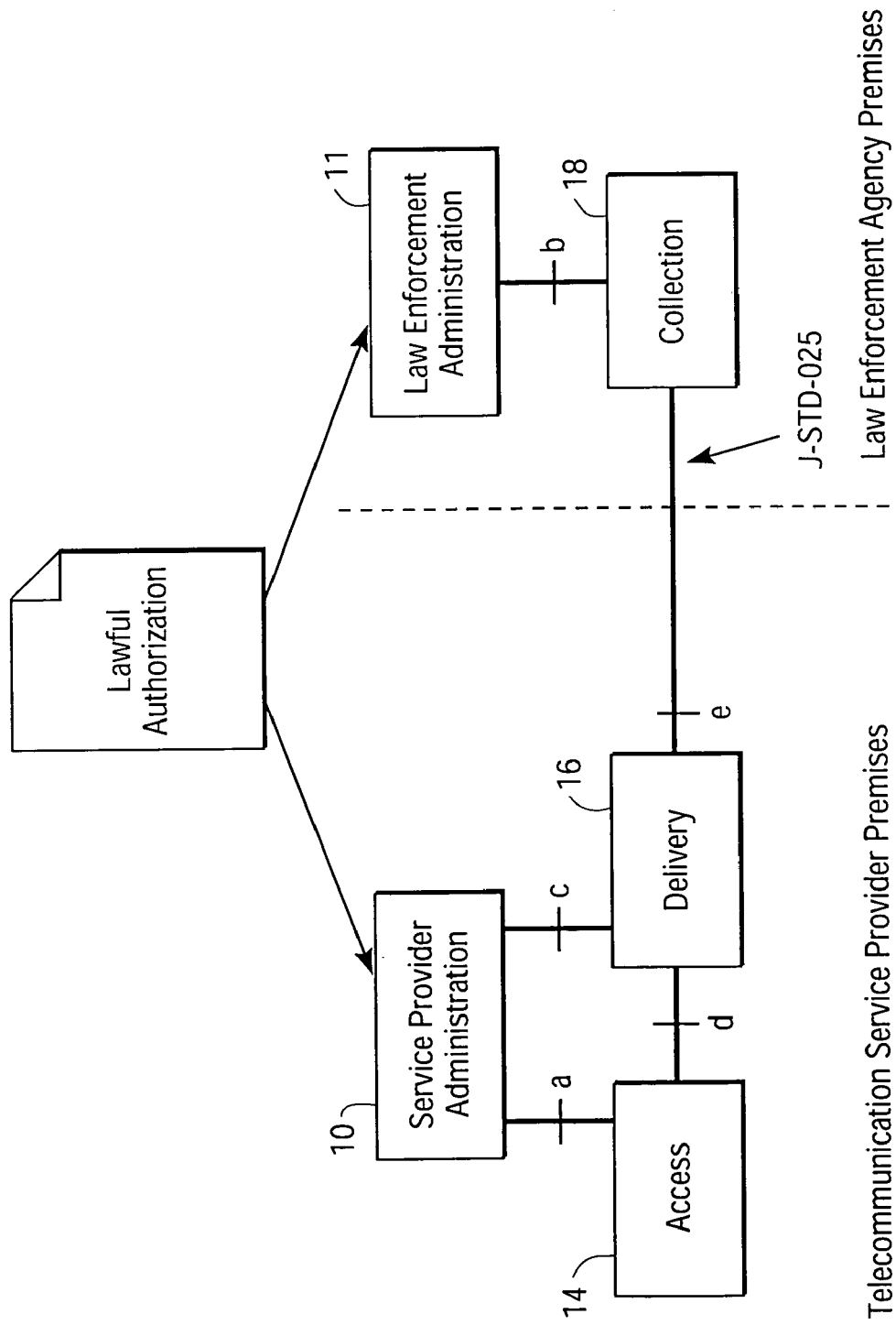
FIG. 1 illustrates a conceptualization of the electronic surveillance model of the Communications Assistance for Law Enforcement Act (CALEA).

In the following detailed description of the invention, reference is made to the accompanying drawings which form a part thereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

As described below, the present invention provides a network based CALEA solution that does not require the modification of each and every end-office switch. Instead, this solution operates in conjunction with the Signaling System 7 (SS7) network, which today provides inter-switch call set-up for approximately 90% of the access lines in the United States. The network based solution of the present invention do not require that a switch manufacturer make internal switch software or hardware modifications in order for the end-office switch utilized by a carrier to provide the capability requirements of CALEA. Instead, carriers choosing to employ a network-based solution make only minor configuration changes to individual switches. These limited changes are expected to be easy for a carrier to implement and are consistent with normal carrier modifications, such as changes to switch translations. No development work on the part of a switch manufacturer should be necessary for the switch itself when the network-based solution of the present invention are used.

AIN Embodiment

Figure 2:
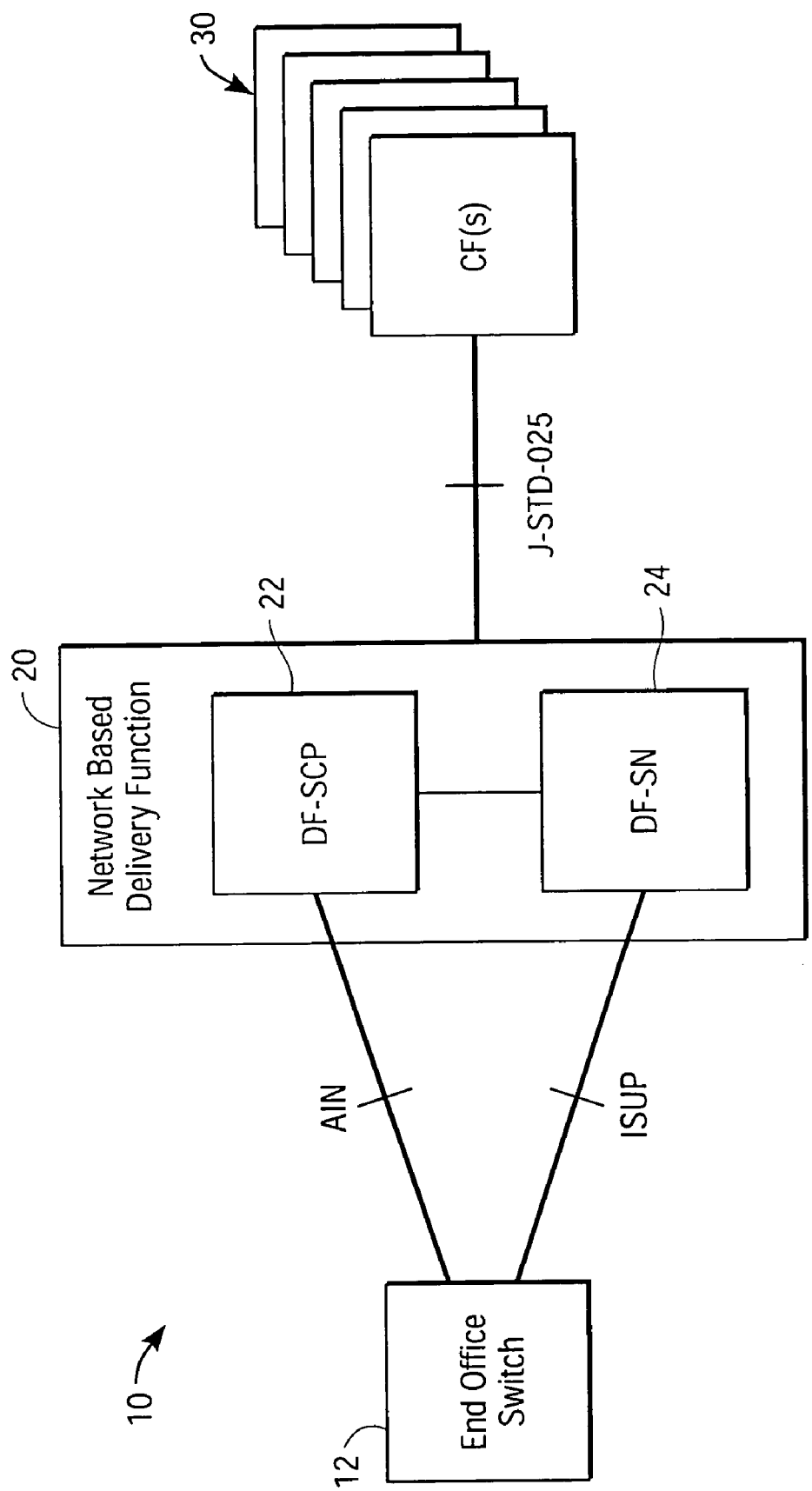
FIG. 2 illustrates a first embodiment of the invention for use in a SS7 network including AIN capability.

Referring to FIG. 2, there is illustrated the architecture 10, of an example embodiment of a network-based CALEA solution using (Advanced Intelligent Network), according to the present invention. In this solution, delivery function (DF) 20 contains a Service Control Point (DF-SCP) 22 and a Service Node (DF-SN) 24. The DF-SCP 22 is a TCAP application which responds to the AIN messages sent by the end-office switch 12. The DF-SN 24 is a switch which receives ISUP calls from the end-office switch 12 and sends those ISUP calls back to the same end-office switch 12. In the meantime, the DF-SN 24 also duplicates the call content and call identifying information to be sent to the collection functions 30 at the law enforcement site. In this solution, the DF-SCP 22 and DF-SN 24 work together in receiving the incoming/outgoing calls to/from the target subscriber to be intercepted and delivering the call identifying information and call content to the law enforcement agency as defined in the J-STD-025. Using the AIN triggers in the end-office switch 12, the SCP interrupts the call processing in the end-office switch 12 and causes the end-office switch 12 to send the call to the delivery function 20 instead of delivering the call to its real destination. The DF-SN 24 is responsible for receiving the calls from the end-office switch 12 and sending the calls back to the same end-office switch 12. While doing that, it also intercepts the call content together with the call identifying information and delivers it to the law enforcement agency collection functions 30 over call content (CCCs) and call data channels (CDCs), in compliance with J-STD-025.

The AIN interface between the end-office switch 12 and the delivery function 20 is an SS7 interface using the Transaction Capabilities Application Part (TCAP) layer. This interface carries only SS7 signaling. On the other hand, the Integrated Services Digital Network User Part (ISUP) interface between the end-office switch 12 and the delivery function 20 is a T1 interface which may carry both SS7-ISUP signaling and the call content (i.e., voice, modem data, etc.). It is also possible that the SS7 signaling is routed through a Signaling Transfer Point (STP), and the T1 interface carries only the call content channels. At least one DS0 in the T1 interface per subject is required for the call content (i.e., voice, modem data, etc.).

The J-STD-025 interface between the delivery function 20 and the collection function(s) 34 is, in one example embodiment, two different interfaces: TCP/IP for call data and T1 for call content. The J-STD-025 interface makes use of TCP/IP network to send the call identifying information using the Lawfully Authorized Electronic Surveillance Protocol (LAESP) messages as defined in J-STD-025. The call content (i.e., voice) maybe sent to the collection function(s) 30 using the T1 interface. At least one DS0 per subject is required for the call content (i.e., voice) in this interface.

Referring now to FIGS. 2–5, a call processing sequence according to one example embodiment of the invention is described in more detail. To initialize intercept operation, InfoCollected and InfoAnalyzed AIN triggers are armed in the end-office switch 12 for the subscribers which are under lawfully authorized electronic surveillance. The InfoCollected trigger is armed such that it shall be hit when the subject under surveillance (SUS) originates a call. The InfoAnalyzed trigger is armed such that it shall be hit when the SUS receives a call from the public switched telephone network (PSTN). Whenever these triggers are hit, the Service Switching Point (SSP) in the end-office switch 12 sends a message to the DF-SCP 22 and waits for instructions from the DF-SCP 22 about how to continue.

Calls Originated by the Subject Under Surveillance

Figure 3:
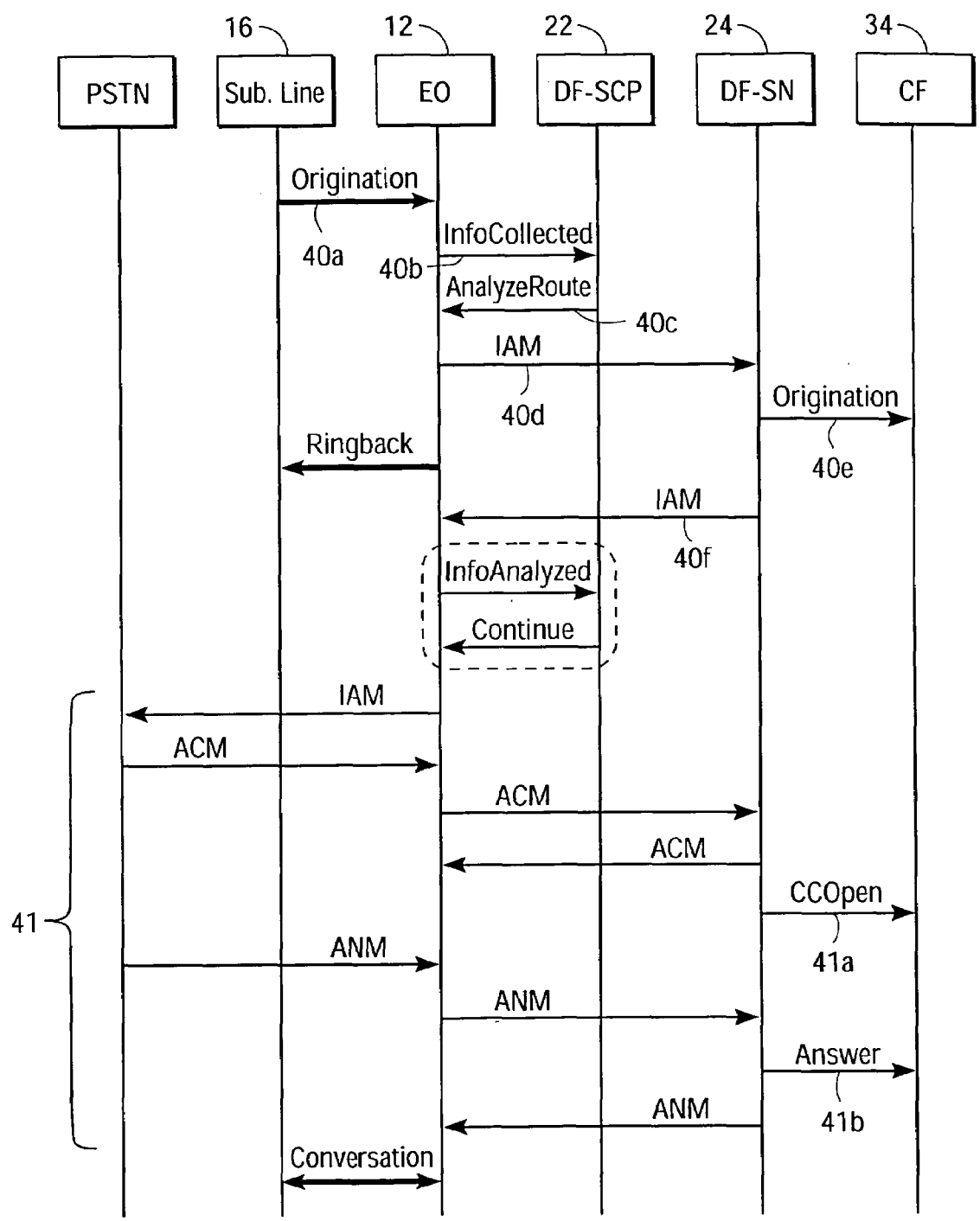
FIGS. 3–6 are call processing diagrams illustrating the operation of the embodiment of FIG. 2, using SS7 nomenclature.

When the SUS originates a call (40a) on a subscriber line 16, the end-office switch 12 collects the digits dialed by the subject. As illustrated in FIG. 3, upon collecting the digits, it will hit the InfoCollected trigger and send an InfoCollected AIN message (40b) to the delivery function 20. The DF-SCP 22 will receive this message, and instruct the SSP of the end-office switch 25 to route the call to the delivery function 20 using an AnalyzeRoute message (40c). Upon receiving the AnalyzeRoute message, the end-office switch 12 shall route the call using ISUP (switch to switch circuit related messaging in SS7) signaling (Initial Address Message—IAM) to the delivery function 20 (40d). The DF-SN 24 will receive the incoming call sent by the end-office switch 12 using the ISUP trunks between the end-office and delivery function 20. The delivery function 20 shall send an "Origination" message as defined in the J-STD-025 to the law enforcement agency to inform them about the call origination (40e). This message shall include the target identity (calling party identity) and dialed digits (called party identity). The DF-SN 24, at the same time, shall send the same call back to the end-office switch 12 using the ISUP trunks between the end-office and delivery function 20 with the same calling and called party id (40f). The end-office switch 12 shall route this call to its destination (41). As part of this sequence, the DF-SN 24 notifies the collection function 30 with a CCOpen message (41a) (pursuant to J-STD-025) that the call content channel is opened after it receives the Address Complete Message (ACM) from the end-office switch 12. It is after this point that the DF-SN 24 starts duplicating the call content, and sends the call content to the collection function(s). Thus, the law enforcement can hear the call progress tones, such as ring back, busy, fast busy, etc. As part of this sequence, the DF-SN 24 notifies the collection function 30 with an Answer message (41b) (pursuant to J-STD-025) that the called party answered the incoming call after it receives the Answer Message (ANM) from the end-office switch 12.

Calls Received by the Subject Under Surveillance

Figure 4:
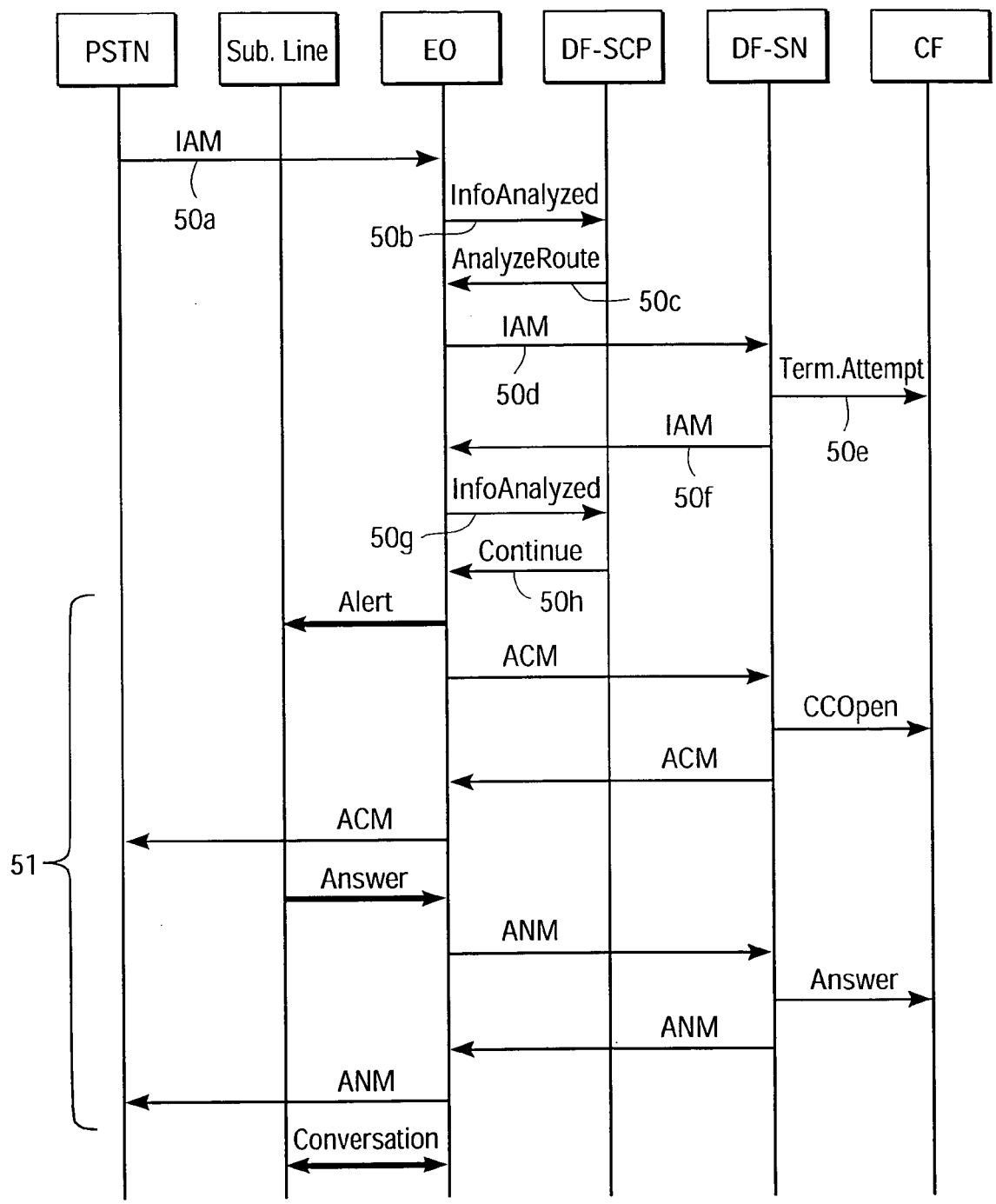

As illustrated in FIG. 4, when the subject under surveillance receives a call, the end-office switch 12 shall receive the call from another entity in the network (i.e., another line in the switch if it is local call, or another switch in the network if it is an inter-office call, or inter-exchange carrier if it is a long distance call) (50a). Upon receiving this incoming call, the switch 12 shall realize that the InfoAnalyzed trigger is armed for the called party number SUS and hit this trigger. Upon hitting this trigger, the end-office switch 12 shall send an InfoAnalyzed AIN message to the delivery function 20 (50b). The DF-SCP 22 will receive this message, and instruct the end-office switch 12 using an AnalyzeRoute message (50c) to route the call to the delivery function 20. Upon receiving the AnalyzeRoute message, the end-office switch 12 shall route the call using ISUP signaling to the delivery function 20 (50d). The DF-SN 24 will receive the incoming call sent by the end-office switch from the ISUP trunks between the end-office and delivery function 20. The delivery function 20 shall send a "Termination Attempt" message as defined in the J-STD-025 to the law enforcement agency to inform them about the call delivery attempt (50e). This message shall include the target identity (called party identity) and calling party number (calling party identity). The DF-SN 24, at the same time, shall send this call back to the same end-office switch 12 using the ISUP trunks between the end-office and delivery function 20 with the same calling and called party id (50f). The end-office switch 12 shall hit the same trigger and send the same InfoAnalyzed message (50g) to the delivery function 20 once again. But this time, knowing that the call is already going through the delivery function 20, the DF-SCP 24 shall send a Continue message to the end-office 12 instructing the SSP to deliver the call to its original destination (50h). The end-office switch 12 shall route this call to its destination (51). As part of this sequence, the DF-SN 24 notifies the collection function 30 with a CCOpen message (41a) (pursuant to J-STD-025) that the call content channel is opened after it receives the Address Complete Message (ACM) from the end-office switch 12. It is after this point that the DF-SN 24 starts duplicating the call content, and sends the call content to the collection function(s). Thus, the law enforcement can hear the call progress tones, such as ring back, busy, fast busy, etc. As part of this sequence, the DF-SN 24 notifies the collection function 30 with an Answer message (41b) (pursuant to J-STD-025) that the SUS answered the incoming call after it receives the Answer Message (ANM) from the end-office switch 12.

Figure 5:
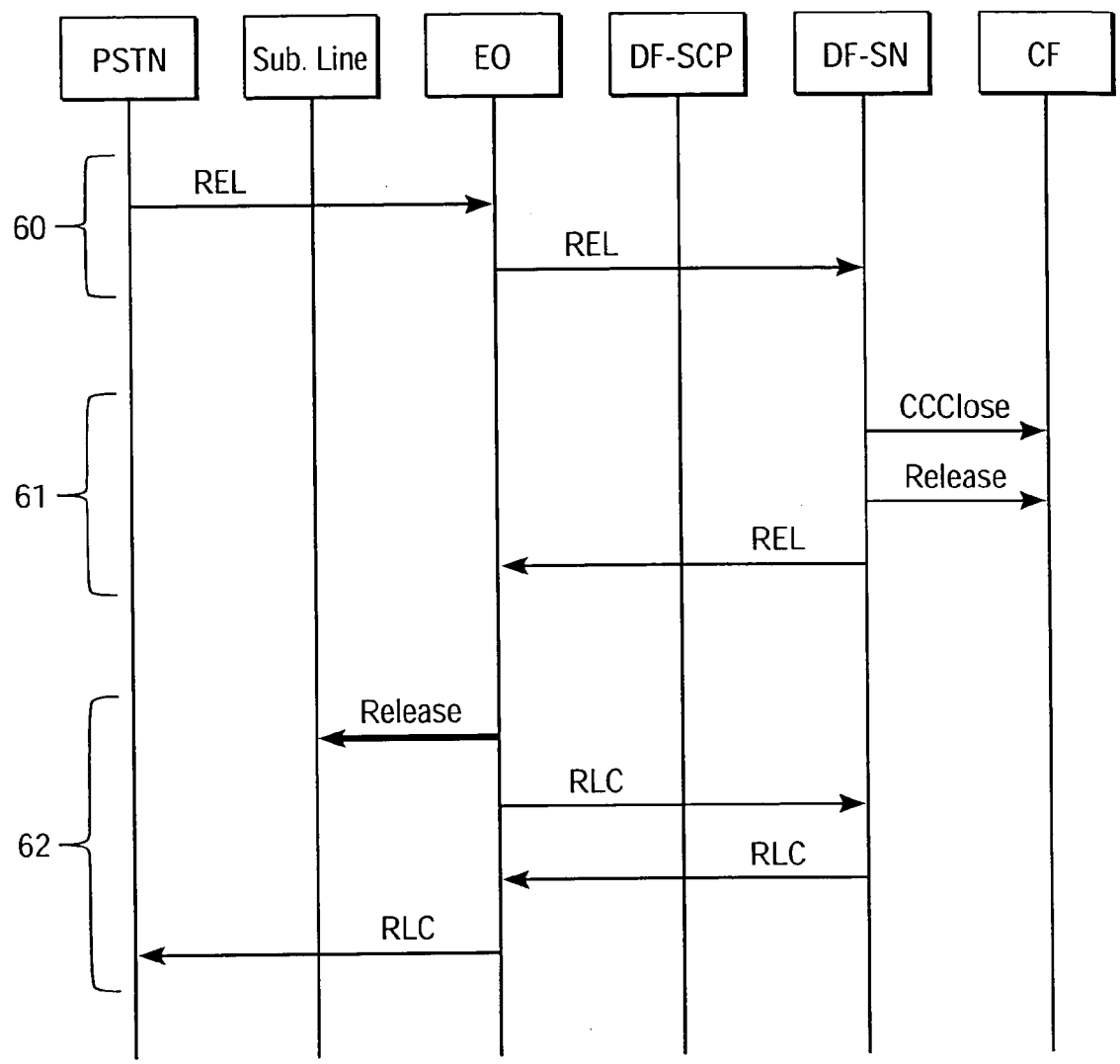
Figure 6:
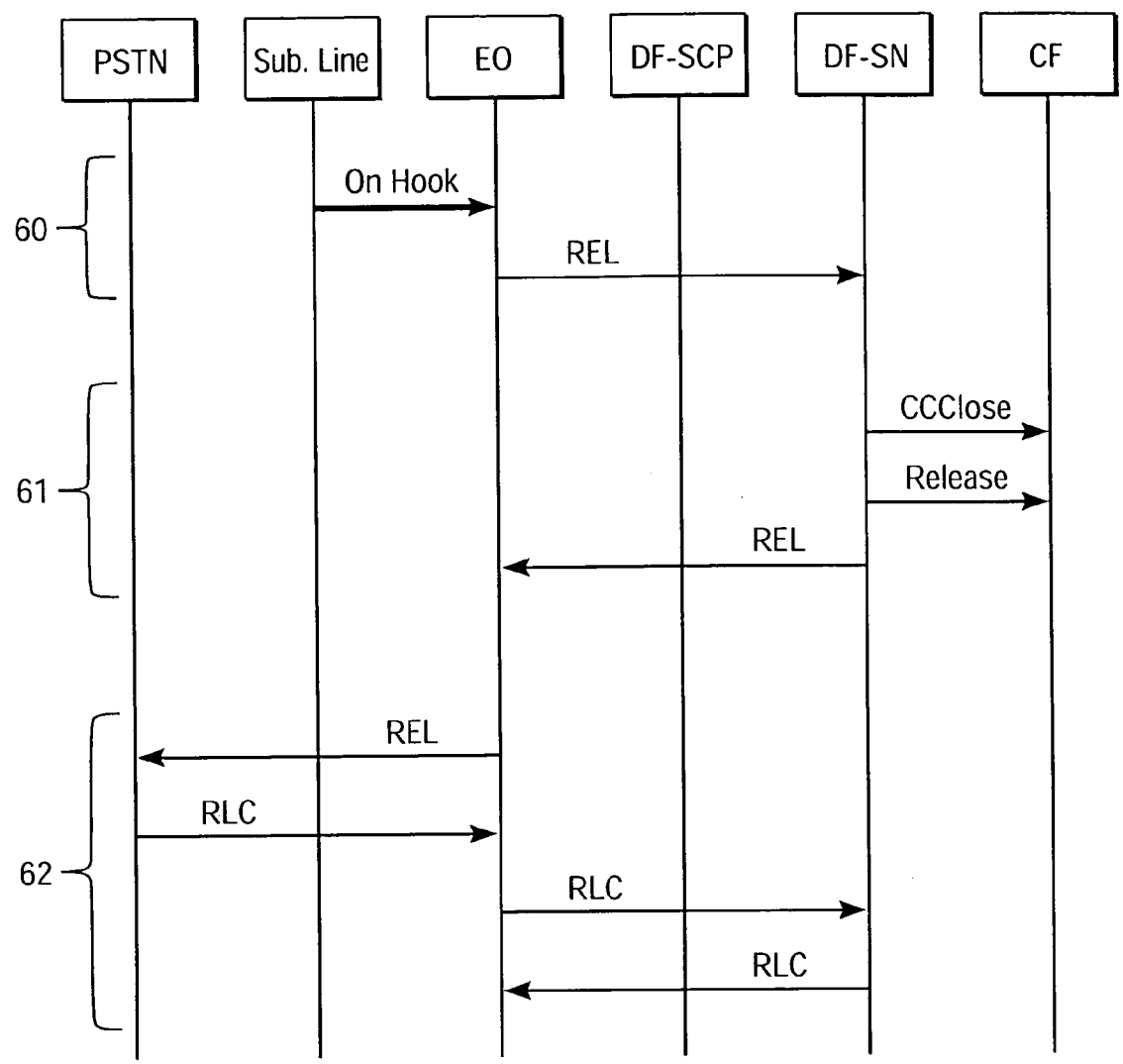

In this architecture, the call is always going through the delivery function 20 like a tandem switch; therefore, the call release is done the same way it is performed in any regular ISUP call as illustrated in FIGS. 5 and 6. After the call is released (60) with the Release (REL) Messages, the delivery function 20 shall notify the law enforcement agency about the release of the call using a "Release" message as defined in the J-STD-025, and clear its resources (61), and the switch 12 completes the call release sequence with Release Complete (RLC) Messages (62).

It is noted that the InfoAnalyzed trigger can also be used for forwarded calls since it is still the same subscriber that has that trigger armed. The call waiting feature is also supported. When the subscriber is busy and a second call comes in, the second call is still routed through the delivery function 20. The O_Mid_Call and T_Mid_Call triggers need to be armed for the SUS with the call waiting feature to get the hook flash indications to the delivery function 20 to be able to determine that the subscriber is switching between two parties using the call waiting feature. The delivery function 20 shall generate the "Change" message as defined in the J-STD-025 and send it the collection function(s) 30.

The three-way calling feature is also supported by the above-described embodiment. When the SUS originates a second call when he/she is already engaged in a call using the hook flash and the three-way calling feature, the second call is still routed through the delivery function 20. The O_Mid_Call and T_Mid_Call triggers need to be armed for the SUS with the three-way calling feature to get the hook flash indications to the delivery function 20 to be able to determine that the subscriber is switching between two parties using the three-way calling feature. The delivery function 20 can also generate the "Change" message as defined in the J-STD-025 and send it the collection function(s) 30. It is noted that there may be some modifications required depending on the implementation of the three-way calling feature in a particular specific end-office switch 12, since there may be some interaction with the call waiting feature. Also, the delivery function 20 software may need to be customized for different implementations of the switch.

IN Embodiment

Figure 7:
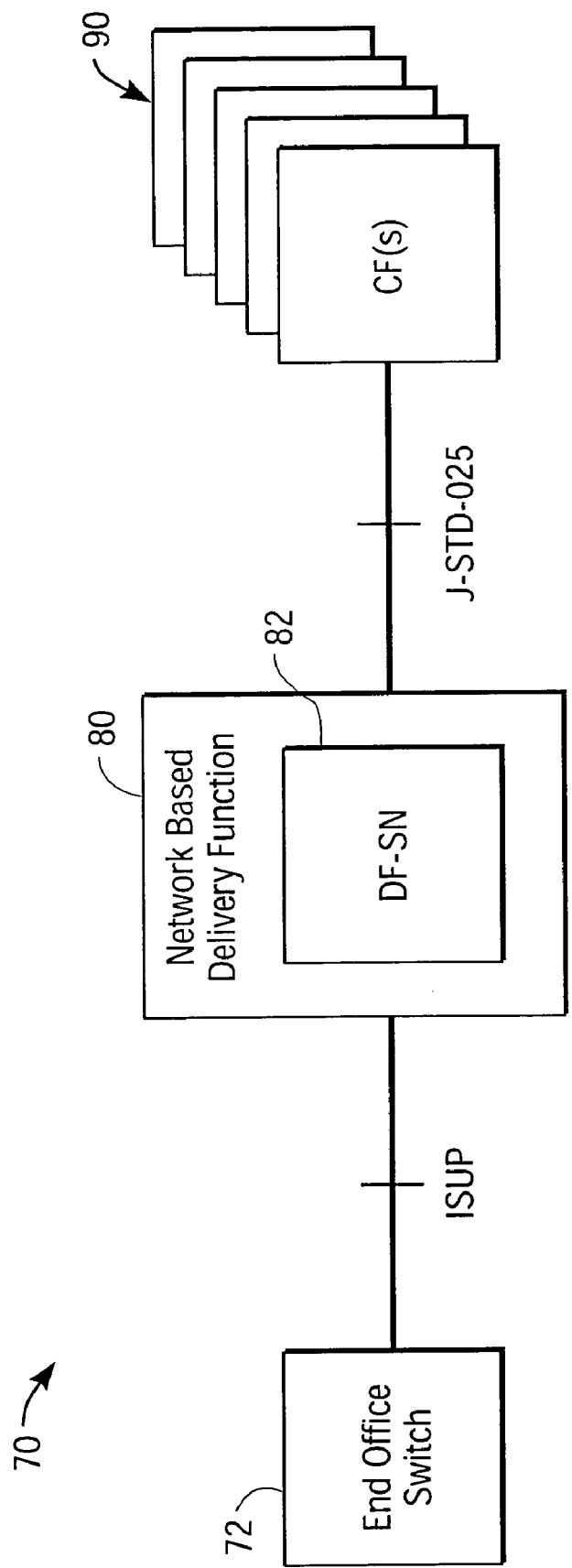
FIG. 7 illustrates a first embodiment of the invention for use in a SS7 network including IN capability only.

Referring now to FIG. 7, there is illustrated an embodiment 70 of the invention used in a Intelligent Network (IN) telephony system. In this solution, the delivery function 80 contains only a Service Node (DF-SN) 82. The DF-SN 82 of the delivery function 80 is a switch which receives ISUP calls from the end-office switch 72 and sends those ISUP calls back to the same end-office switch 72. While doing that, it will also intercept the call content and duplicate them, and then deliver the call content together with the call identifying information to the law enforcement agency over call content and call data channels. In this solution, the end-office switch 72 needs to be configured and intelligent enough to send the calls originated/received by the subject under surveillance to the delivery function 80 over the ISUP interface between them. Therefore, this solution relies on the intelligence and configurability of the end-office switch 72.

The ISUP interface between the end-office switch 72 and the delivery function 80 is a T1 interface which may carry both SS7-ISUP signaling and the call content (i.e., voice, modem data, etc.). It is also possible that the SS7 signaling is routed through a Signaling Transfer Point (STP), and the T1 interface carries only the call content channels. At least one DS0 in the T1 interface per subject is required for the call content (i.e., voice, modem data, etc.). The J-STD-025 interface between the delivery function 80 and the collection function(s) 90 is the same as described above with respect to architecture 10.

In order to implement embodiment 70, there must be available some extra NXX-XXXX numbers in the switch 72 for the surveillance. Also, some of the NXX-XXXX numbers have to be routable to the delivery function 80 via ISUP trunks. The end-office switch 72 also needs to be configured such that a call can be routed based on the calling party number 72. Further, it is required that the end-office operator can change the line identity of the line card dedicated to the SUS's.

The embodiment 70 is best described using an example. Assume for this description that the subject under surveillance (SUS) has the phone number 203-925-6100 and that the number 203-925-9999 is reserved in the end-office switch 72 for lawfully authorized electronic surveillance. The routing table of the switch should thus be configured such that when a call is originated from the 203-925-9999 number, the call is routed to the delivery function 80. When a law enforcement agency comes with a court order for the SUS, the end-office operator shall change the identity of the line card dedicated for SUS to 203-925-9999 from 203-925-6100. The operator also needs to change the routing tables of the switch 72 such that when a call comes in to the number 203-925-6100, the call will be routed to the delivery function 80 via the ISUP trunks going to the delivery function 80.

Calls Originated by the Subject Under Surveillance

Figure 8:
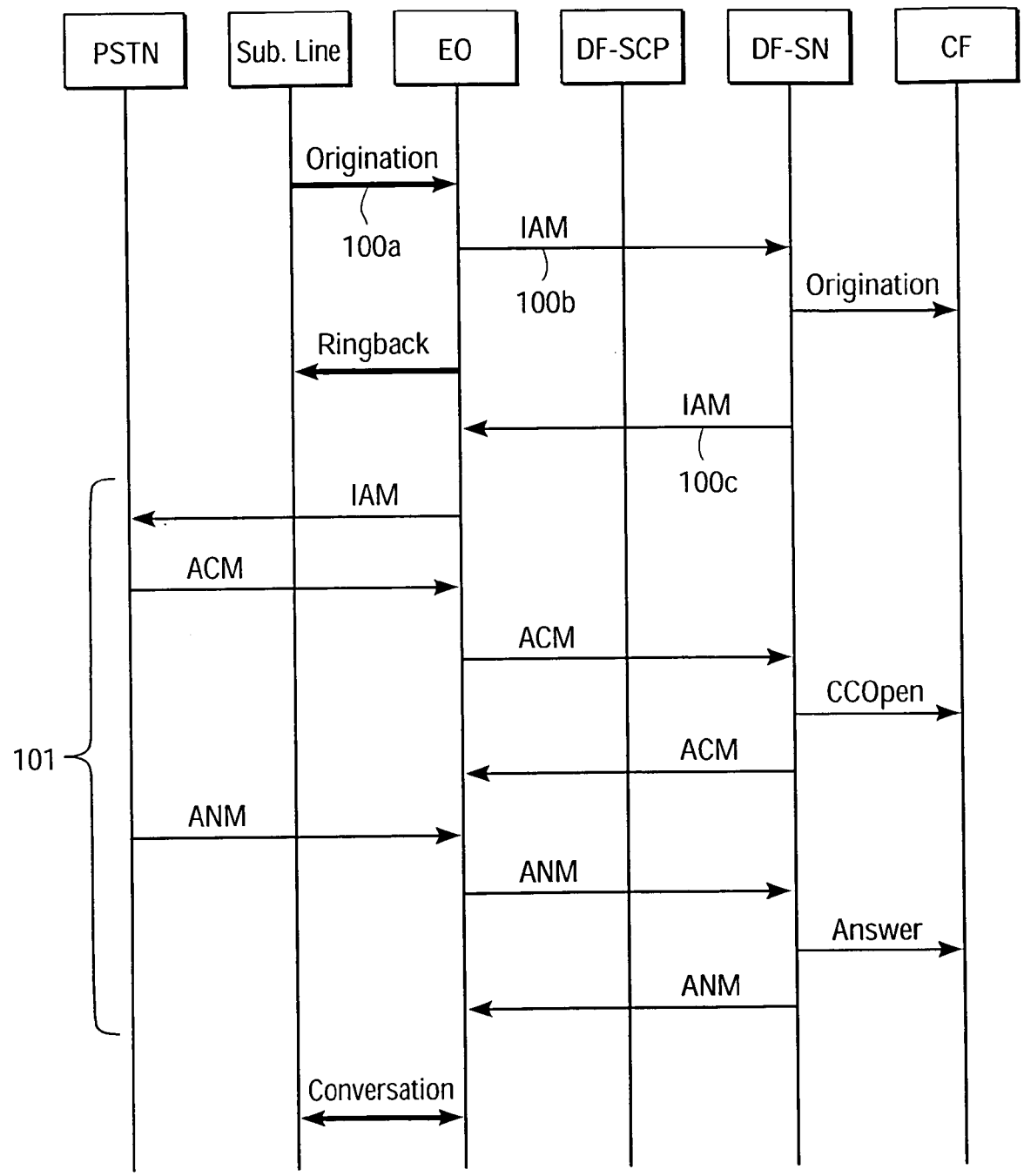
FIGS. 8–11 are call processing diagrams illustrating the operation of the embodiment of FIG. 7, using SS7 nomenclature.

The following description is made with respect to FIG. 8. When the SUS originates a call (100a) by dialing, for example, 203-925-5555, the end-office switch 72 shall send the call to the delivery function 80 via the ISUP trunks between the end-office switch 72 and the delivery function 80 (100b). The calling party address in the IAM message shall be 203-925-9999, and the called party address shall be the 203-925-5555. The delivery function 80 shall receive this call and send the call back to the end-office switch 72 again using the ISUP trunks between the end-office switch 72 and the delivery function 80 (100c). This time the calling party address in the IAM message shall be 203-925-6100, and the called party address shall be the 203-925-5555. The end-office switch 72 shall route this call just like it does to any other call (101). Since the call goes through the delivery function 80, delivery function 80 shall duplicate the call content and deliver the call data and call content to the law enforcement site(s). As part of this sequence, the DF-SN 82 notifies the collection function 90 with a CCOpen message (101) (pursuant to J-STD-025) that the call content channel is opened after it receives the Address Complete Message (ACM) from the end-office switch 72. It is after this point that the DF-SN 82 starts duplicating the call content, and sends the call content to the collection function(s). Thus, the law enforcement can hear the call progress tones, such as ring back, busy, fast busy, etc. As part of this sequence, the DF-SN 82 notifies the collection function 90 with an Answer message (101) (pursuant to J-STD-025) that the called party answered the incoming call after it receives the Answer Message (ANM) from the end-office switch 72.

Calls Received by the Subject Under Surveillance

Figure 9:
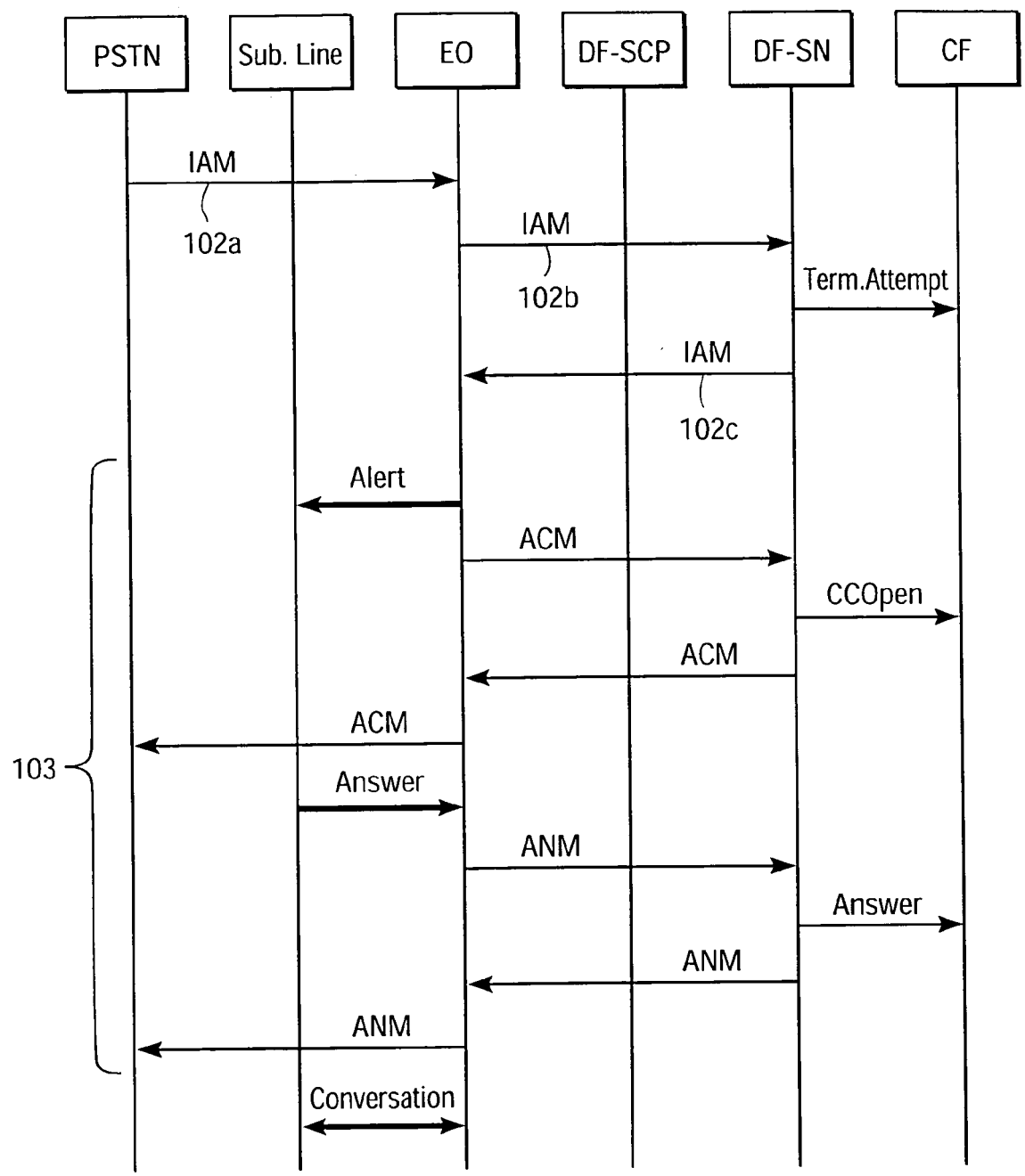

The following description is made with respect to FIG. 9. When the SUS receives a call (102a), for example, from 203-925-5555, the end-office switch 72 shall send the call to the delivery function 80 via the ISUP trunks between the end-office switch 72 and the delivery function 80 (102b). The calling party address in the IAM message shall be 203-925-5555, and the called party address shall be the 203-925-6100. The delivery function 80 shall receive this call and send the call back to the end-office switch 72 again using the ISUP trunks between the end-office switch 72 and the delivery function 80 (102c). The calling party address in the IAM message shall still be 203-925-5555, but the called party address will be set to 203-925-9999 by the delivery function 80. The end-office switch 72 shall deliver this call to the SUS just like it does to any other call. Since the call goes through the delivery function 80, the delivery function 80 shall duplicate the call content and deliver the call data and call content to the law enforcement site(s). As part of this sequence, the DF-SN 82 notifies the collection function 90 with a CCOpen message (103) (pursuant to J-STD-025) that the call content channel is opened after it receives the Address Complete Message (ACM) from the end-office switch 72. It is after this point that the DF-SN 82 starts duplicating the call content, and sends the call content to the collection function(s). Thus, the law enforcement can hear the call progress tones, such as ring back, busy, fast busy, etc. As part of this sequence, the DF-SN 82 notifies the collection function 90 with an Answer message (103) (pursuant to J-STD-025) that the SUS answered the incoming call after it receives the Answer Message (ANM) from the end-office switch 72.

Figure 10:
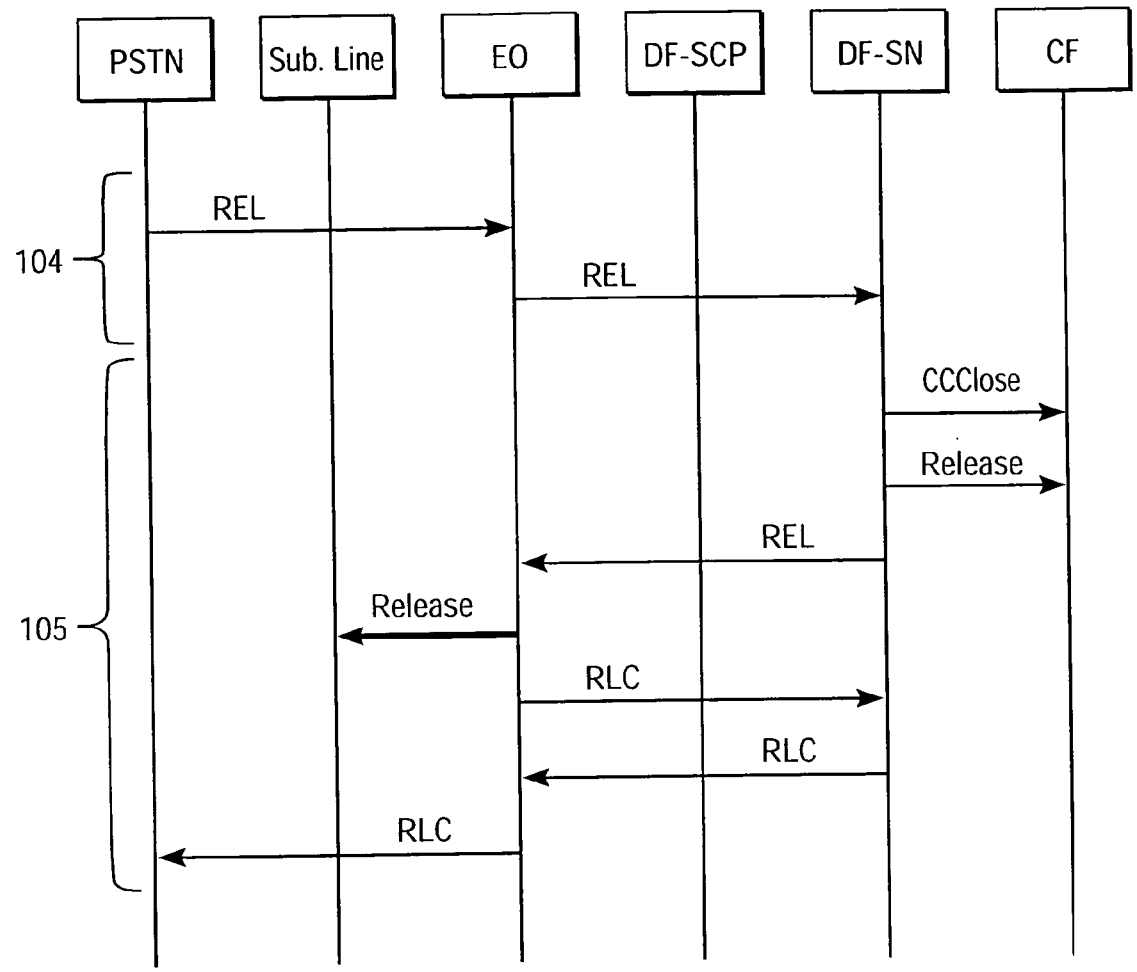
Figure 11:
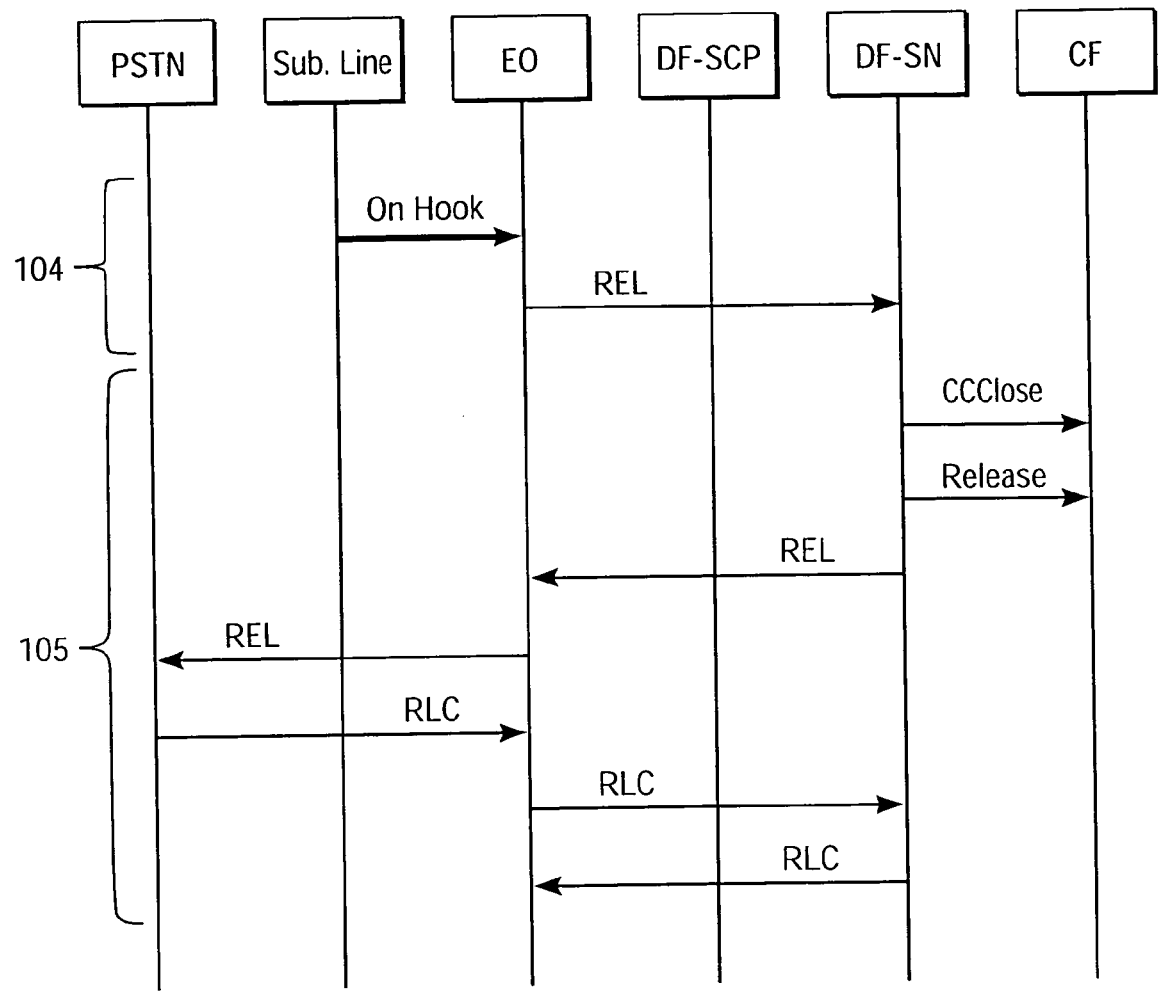

In this architecture, the call is always going through the delivery function 80 like a tandem switch; therefore, the call release is done the same way it is performed in any regular ISUP call. After the call is released, the delivery function 80 shall notify the law enforcement agency about the release of the call (104) using a "Release" message as defined in the J-STD-025, and clear its resources (105). These release sequences are illustrated in FIGS. 10 and 11.

Call forwarding feature is also reported by this implementation. Since the subject's phone number is moved to the delivery function 80, all the calls coming to the subject will still go through the delivery function 80 regardless of the call forwarding. However, it is noted that if the subject under surveillance can activate/deactivate its call forwarding feature by dialing the *FC, the delivery function 80 will not be aware of those changes after the surveillance is started. In these cases, the delivery function will inform the operator by generating alarms, and operator will make the changes in the subscriber profile within the end-office switch.

The call waiting feature is supported in this embodiment as follows. When the subscriber is busy and a second call comes in, the second call is still routed through the delivery function 80. When the second call comes in, and the SUS answers the call by hook flash, the delivery function 80 receives an ANM message and will notify the law enforcement using the "Change" message as defined in the J-STD-025, and also send the call content using a separate channel.

The three-way calling embodiment is supported in this embodiment as follows. When the subscriber originates a second call when he/she is already engaged in a call, using the hook flash and the three-way calling feature, the second call is still routed through the delivery function 80. When the second call is answered by the called party, the delivery function 80 receives an ANM message and will notify the law enforcement using the "Change" message as defined in the J-STD-025, and also send the call content using a separate channel.

Implementations Features

The delivery function in the embodiments described above can be implemented in either hardware or software or a combination thereof. Likewise, many of the functions or devices described above as implemented in hardware or software are equally implementable in whole or in part in software or hardware, respectively. Thus, with respect to the claims appended hereto, the term "unit" shall mean an electronic entity, which may be, for example, a hardware circuit or device or software executing on a computing platform, or a combination of such.

As an alternate implementation, the delivery function can also access the SS7-ISUP signaling information using a passive monitoring device that can listen to the SS7 links and filter those messages that are related to the SUS. The delivery function will then generate the J-STD-025 messages from the information gathered by the passive monitoring device.

It shall be further noted that the invention is in no way limited to application to SS7 AIN or IN networks. Rather, the invention will work in connection with any telephone network which includes substantially the same functionality, or at least portions thereof, of an SS7 AIN or IN network that is relevant to the implementation of the invention. Moreover, the invention could be applied to any telephone network that can be customized to include the capabilities needed to forward calls to the delivery function as described herein.

Conclusion

Thus, the invention as described above provides methods for all processing and apparatus for example, carrying out the methods, in order to provide electronic surveillance in a SS7 Intelligent Network (IN) or Advanced Intelligent Network (AIN). As noted above, one potential advantage of this methodology and apparatus is that it can be implemented with a minimal number of modifications to the existing end office equipment.

The invention claimed is:

1. A method of intercepting calls for a subject under surveillance (SUS) in a Signaling System 7 (SS7) Intelligent Network (IN) compliant telephone system, wherein the SUS has an assigned first telephone number that others use to call the SUS on a SUS subscriber line, the method comprising:

assigning to the SUS a surveillance telephone number for surveillance purposes, wherein both the first telephone number and the assigned surveillance telephone number are used to route telephone calls to the SUS, and wherein the surveillance telephone number and the first telephone number for the SUS are different;

in an end office switch, configuring the identity of a line card for the SUS to the surveillance telephone number so that calls placed by the SUS identify the SUS as a calling party by the surveillance telephone number;

configuring a routing table of the end office switch so that the calls placed by the SUS to a called party telephone number are forwarded to a delivery function unit, and so that calls placed to the SUS using the first telephone number are forwarded to the delivery function unit;

the delivery function unit receiving the forwarded calls, and identifying the SUS by the surveillance telephone number as the calling party or by the first telephone number as a called party;

the delivery function unit forwarding calls placed by the SUS back to the end office switch with the calling party identified with the SUS's first telephone number and with the called party telephone number provided by the SUS so that the end office switch forwards calls placed by the SUS to the called party, and forwarding calls placed to the SUS to the end office switch with the surveillance telephone number as the called party telephone number and with the calling party telephone number the same as received from the end office switch so that calls placed to the SUS are connected to the SUS's subscriber line; and the delivery function unit further obtaining a copy of call content for any calls forwarded through the delivery function unit.

2. A method according to claim 1 wherein the delivery function unit sends the call content to a remote location according to one or more court orders pertinent to the SUS.

3. A method according to claim 2 wherein the remote location includes a collection function for collecting the call content.

4. A method according to claim 1 including:
routing to the delivery function unit a second call to the SUS's subscriber line using a call waiting feature of the end office switch; and
the delivery function unit generating a change message when the SUS switches between the first and second calls.

5. A method according to claim 1 including:
routing to the delivery function unit a second call originated on the SUS's subscriber line using a three way calling feature of the end office switch; and
the delivery function unit generating a change message when the SUS switches between the first and second calls.

6. A method according to claim 1 wherein a call to a SUS's subscriber line is forwarded by the end office switch using a call forward feature.

7. A delivery function apparatus for use with a SS7 Intelligent Network (IN) compliant telephone system, comprising a SS7 IN compatible call processing unit configured to receive a first forwarded SS7 call, wherein identifying information for the first forwarded call indicates that the first forwarded call was placed by a suspect under surveillance (SUS), and configured to output the first forwarded call with a calling party telephone number equal to a telephone number provided to the SUS;

the call processing unit further configured to receive a second forwarded SS7 call, wherein identifying information for the second forwarded call indicates that a called party is the SUS, and configured to output the second forwarded call with a called party telephone number equal to a telephone number of the SUS's telephone line, so that the forwarded call is connected to the SUS; wherein the called party telephone number output with the second forwarded call is a surveillance telephone number that is different from the calling party telephone number output with the first forwarded call;

the call processing unit further configured to output call content to a collection function.

8. A method of intercepting calls for a subject under surveillance (SUS) having a telephone line in a Signaling System 7 (SS7) Intelligent Network (IN) compliant telephone system, wherein the SUS has an assigned first telephone number that others use to call the SUS on the SUS's telephone line, the method comprising:

assigning to the SUS a surveillance telephone number for surveillance purposes, wherein both the first telephone number and the assigned surveillance telephone number are used to route telephone calls to the SUS, and wherein the surveillance telephone number and the first telephone number for the SUS are different;

in an end office switch, configuring the identity of a line card for the SUS to the surveillance telephone number so that calls placed by the SUS to a called party identify the SUS as a calling party by the surveillance telephone number;

configuring a routing table of the end office switch so that the calls placed by the SUS are forwarded to a delivery function unit;

the delivery function unit receiving the forwarded calls, and identifying the SUS by the surveillance telephone number as the calling party or by the first telephone number as the called party;

the delivery function unit forwarding calls placed by the SUS back to the end office switch with the calling party identified with the SUS's first telephone number and with the called party telephone number provided by the SUS so that the end office switch forwards the call to the called party; and the delivery function unit further obtaining a copy of call content for calls forwarded through the delivery function unit.

* * * * *